United States Patent
Burrell et al.

(10) Patent No.: US 7,068,763 B2
(45) Date of Patent: Jun. 27, 2006

(54) COMMUNICATION TERMINAL DEVICE

(75) Inventors: Gary Burrell, Wyckoff, NJ (US); Roy Charles McNeil, Jr., Warwick, NY (US)

(73) Assignee: Murata Kikai Kabushiki Kaisha, Kyoto (JP)

( * ) Notice: Subject to any disclaimer, the term of this patent is extended or adjusted under 35 U.S.C. 154(b) by 116 days.

(21) Appl. No.: 10/745,651

(22) Filed: Dec. 29, 2003

(65) Prior Publication Data
US 2004/0146050 A1 Jul. 29, 2004

(30) Foreign Application Priority Data
Jan. 27, 2003 (JP) ............................ 2003-017006

(51) Int. Cl.
*H04M 11/00* (2006.01)
(52) U.S. Cl. .............................. 379/88.13; 379/100.15; 379/100.16
(58) Field of Classification Search .................... None
See application file for complete search history.

(56) References Cited

U.S. PATENT DOCUMENTS

| | | | | |
|---|---|---|---|---|
| 6,002,752 A | * | 12/1999 | Park | 379/100.15 |
| 6,445,694 B1 | * | 9/2002 | Swartz | 370/352 |
| 6,463,145 B1 | * | 10/2002 | O'Neal et al. | 379/211.02 |
| 6,785,379 B1 | * | 8/2004 | Rogers et al. | 379/265.02 |

FOREIGN PATENT DOCUMENTS

| | | |
|---|---|---|
| JP | 2000-174904 | 6/2000 |
| JP | 2002-101256 | 4/2002 |

OTHER PUBLICATIONS

SIP Support for Real-time Fax: Call Flow examples And Best Current Practices<draft-ietf-sipping-realtimefax-00.txt>.
Junichiro Yamazaki, We really did "Free Phone" by the Internet Telephone, internet magazine, Oct. 1, 2002, No. 93, p. 86-117.
Haruo Oikawa, Call Control Protocol for VoIP, Network Magazine, ASCII Corporation, Nov. 1, 2002, vol. 7, No. 11, p. 142-145.
Notofication of Reason(s) for Refusal for Japanese application No. 2003-017006.

* cited by examiner

*Primary Examiner*—Creighton Smith
(74) *Attorney, Agent, or Firm*—Westerman, Hattori, Daniels & Adrian, LLP.

(57) ABSTRACT

To provide a communication terminal device which can select whether to answer an incoming call from an IP network, and a communication terminal device which improves convenience of a user by executing an appropriate process when there are a plurality of incoming calls. The communication terminal device of the present invention receives an incoming call by a call control protocol, establishes a connection with a transmitter by the call control protocol, and determines whether the incoming call relates to voice communication over the established connection.

15 Claims, 5 Drawing Sheets

COMMUNICATION TERMINAL DEVICE

FIELD OF THE INVENTION

The present invention relates to a communication terminal device which transmits various data such as voice data, image data or text data by using an Internet Protocol (IP) network as a data transmission channel.

DESCRIPTION OF THE RELATED ART

Recently, IP telephone communication for telephoning by using an IP network and an IP facsimile communication for carrying out a facsimile by also using the IP network have become widespread. Furthermore, a so-called multifunction peripheral is being developed, which combines a plurality of communication functions in one device. For example, there is a communication terminal device which includes an IP telephone communication function and an IP facsimile communication function based on the International Telecommunication Union-Telecommunications (ITU-T) Recommendation T.38. The communication terminal device can simultaneously carry out transmission and reception using IP telephone communication and IP facsimile communication.

When carrying out the IP telephone communication or the IP facsimile communication, a control that corresponds to the processing handled by an exchanger in a general public network, such as calling the other end or managing a call, is carried out by a call control protocol. For the call control protocol, H0.323 and a Session Initiation Protocol (SIP) (Request For Comments (RFC) 2543) are used widely. In particular, the SIP just establishes, changes, and ends a session and does not concern itself with the contents of the session. Therefore, the SIP can execute various communication protocols such as a Simple Mail Transfer Protocol (SMTP) or a Hyper Text Transfer Protocol (HTTP) over a connection established between a transmitting side and a receiving side, not only IP telephone communication or IP facsimile communication. Thus, the communication terminal devices of the transmitter and the recipient can directly exchange data in real-time over the SIP with one another.

However, when there is an incoming call from the IP network by the call control protocol, the reception process is started immediately in the above-described communication terminal device. As a result, an operator could not select whether or not to answer the incoming call from the IP network.

There is a technology such as the above-described communication terminal device that divides a receiving packet, receives an incoming call from a plurality of transmitters at the same time, and establishes a connection with each of the transmitters. However, a communication terminal device, which implements an even more convenient function by using such a technology, is not on the market yet.

SUMMARY OF THE INVENTION

The present invention was made in consideration to the above-described circumstance. An advantage of the present invention is to provide a communication terminal device which can select whether or not to answer an incoming call from an IP network, and a communication terminal device which improves convenience of a user by executing an appropriate process when there are a plurality of incoming calls.

The communication terminal device of the present invention receives an incoming call by a call control protocol, establishes a connection with a transmitter by the call control protocol, and over the established connection, determines whether or not the incoming call is voice communication. Therefore, the communication terminal device of the present invention can select whether or not to answer an incoming call from the IP network, and execute an appropriate process when there are a plurality of incoming calls. As a result, the communication terminal device can improve the convenience of the user.

Moreover, the communication terminal device of the present invention calls an operator for all incoming calls, and only when the operator carries out an operation to answer the incoming call, the communication terminal device answers the incoming call. Therefore, regardless of whether it is voice communication or data communication, the operator can select whether or not to answer the incoming call.

According to the present invention, when there are a plurality of incoming calls relating to voice communication, the communication terminal device answers one of the incoming calls, and transmits a connection rejecting signal to a transmitter of another incoming call that was not answered by the communication terminal device. Therefore, the transmitter of the incoming call that was not answered by the communication terminal device can determine at an early stage that the communication terminal device cannot establish a connection.

Moreover, the communication terminal device of the present invention determines whether the incoming call relates to the voice communication or to the data communication other than the voice communication. Therefore, when there are a plurality of incoming calls relating to the data communication, the communication terminal device can automatically carry out a data receiving process for each of the incoming calls without carrying out a notification of the incoming calls.

DETAILED DESCRIPTION OF THE PREFERRED EMBODIMENTS

First Embodiment

Figure 1:
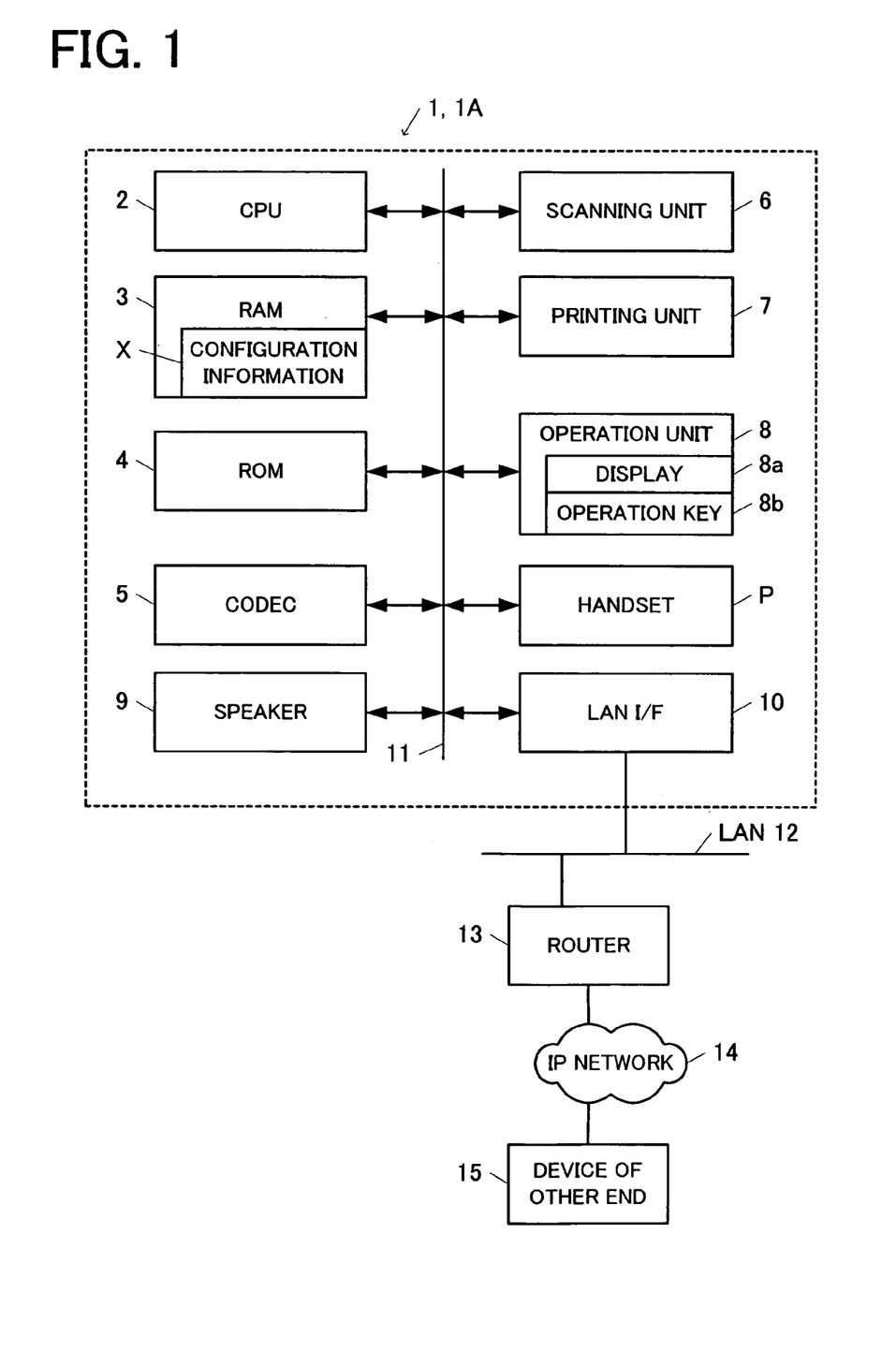
FIG. 1 is a block diagram showing an example of a configuration of a communication terminal device according to an embodiment of the present invention.

A communication terminal device according to a first embodiment of the present invention will be described with reference to the drawings. As an example of the communication terminal device, FIG. 1 shows an example of a configuration of a facsimile machine 1 having a function for carrying out voice communication and data communication other than the voice communication (hereinafter the data communication other than the voice communication will be simply referred to as "data communication") using an IP network by a call control protocol. That is, the facsimile machine 1 includes a Central Processing Unit (CPU) 2, a Random Access Memory (RAM) 3, a Read Only Memory (ROM) 4, a codec 5, a scanning unit 6, a printing unit 7, an operation unit 8, a handset P, a speaker 9 and a Local Area Network (LAN) interface 10. Each of the units 2 through 10 is connected via a bus 11 in a manner that communication can be carried out.

The CPU 2 controls each of the units of the facsimile machine 1 in accordance with a prescribed program. The RAM 3 functions as a storage unit which stores image data, various pieces of configuration information, configuration information X to be described later, or the like. The RAM 3 also functions as a storage unit for various data stored temporarily. The ROM 4 stores various programs for the CPU 2 to control an operation of each of the units of the facsimile machine 1.

The configuration information X is registered with one of "constant notification" configuration or "voice communication notification" configuration. Further, under the "constant notification" configuration, when the facsimile machine 1 receives an incoming call from the IP network, a notification for calling the operator is carried out at all times. Under the "voice communication notification" configuration, only when there is an incoming call of the voice communication, a notification is carried out. The above-described configurations can be registered by a prescribed operation of the operator from the operation unit 8.

The codec 5 encodes and decodes according to a format of the communication protocol to be used. For example, the codec 5 encodes and decodes image data in accordance with a Tagged Image File Format (TIFF) that is an image format attached to electronic mail transmitted and received by the SMTP.

The scanning unit 6 scans image data of an original document, and forms image data binarized in black and white. The printing unit 7 uses an electro-photographic method or the like, and prints the received image data or the like onto a recording paper.

The operation unit 8 includes a display 8a, an operation key 8b or the like, and various operations are carried out from the operation unit 8 by the operator. Further, the display 8a displays information relating to a status of the facsimile machine 1, various screens or the like. The operation key 8b is used for inputting various pieces of information such as an IP telephone number (a telephone number for IP network that is defined by a telephone number system of an Intranet or a telephone company; for example, a telephone number starting from "050-") and an electronic mail address.

The LAN interface 10 is an interface for the LAN 12, and connects the facsimile machine 1 to the LAN 12 in a manner that communication can be carried out. A router 13 is provided to the LAN 12. The facsimile machine 1 can carry out data communication in real-time directly with a device of other end 15 in an IP network 14 through the router 13 by using a call control protocol to be described later.

The facsimile machine 1 includes a User Datagram Protocol/Internet Protocol (UDP/IP) and a SIP as the call control protocol. The facsimile machine 1 also includes a function for carrying out the voice communication or the data communication of image data, text data or the like by directly executing on the device of other end, various communication protocols (specifically, the communication protocol such as Voice over IP (VoIP), the SMTP or the HTTP) with a connection by the SIP (hereinafter referred to as the "SIP connection") established with the device of other end 15 designated by the IP telephone number.

Figure 2:
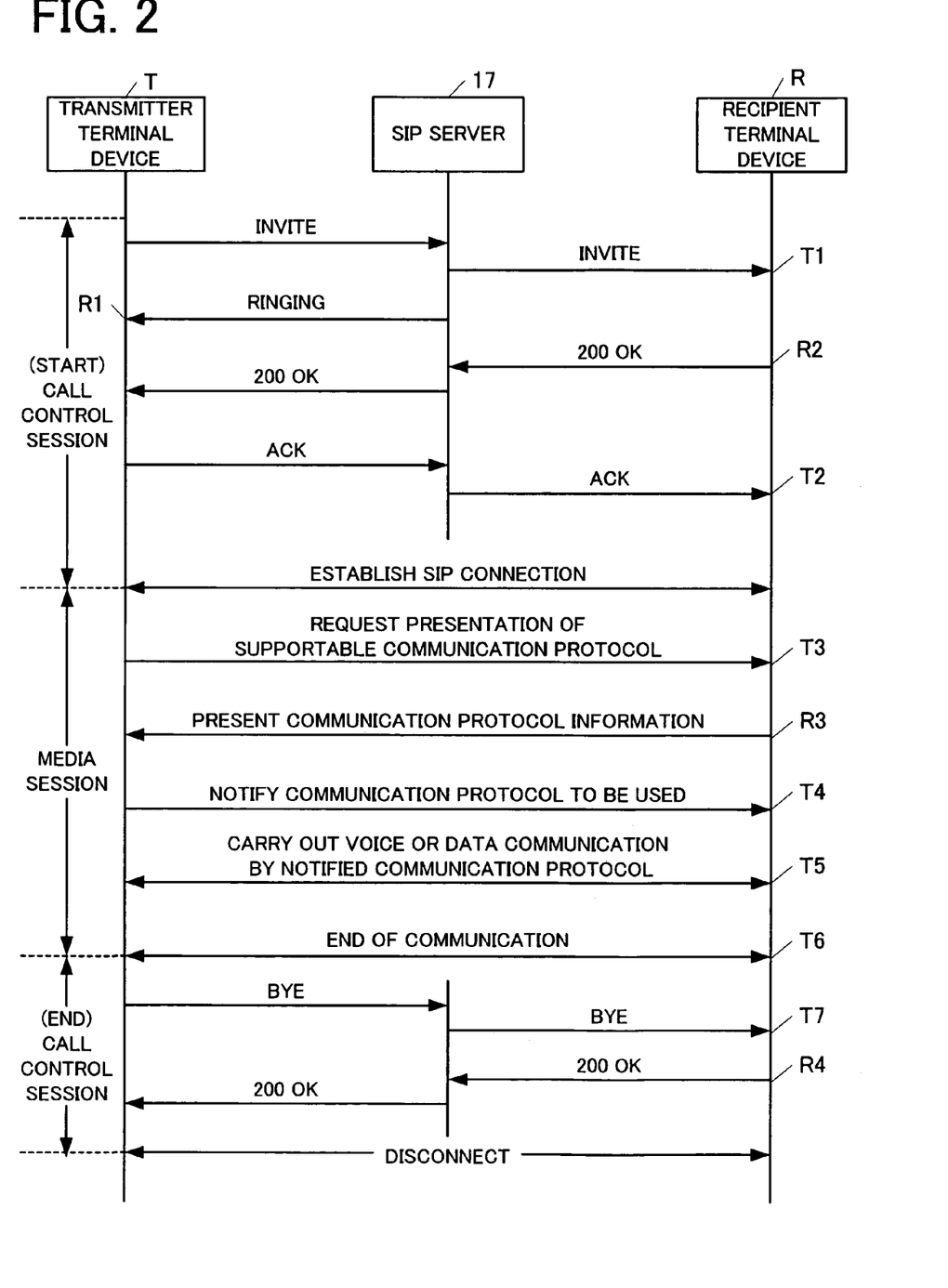
FIG. 2 is a sequence diagram showing an example of a session formed when communicating by a SIP (call control protocol).

As shown in FIG. 2, the facsimile machine 1 as a recipient terminal device R forms a call control session with a device of other end 15 (transmitter terminal device T) also having the UDP/IP, the SIP, the VoIP, the SMTP, the HTTP or the like. Then, the recipient terminal device R establishes an SIP connection, and after forming a media session (an example is shown in the drawing) over the established SIP connection, forms a call control session for disconnecting the communication.

That is, the transmitter terminal device T requests the SIP server 17 to make a call to the recipient terminal device R by "INVITE" that designates the IP telephone number. The SIP server 17 that received the request inquires as to an IP address of the IP telephone number designated by the transmitter terminal device T to a location server (not shown) having information for associating the IP telephone number and the IP address. The SIP server 17 obtains the IP address, and makes a call by transmitting "INVITE" to the recipient terminal device R designated by the IP address (T1). At this time, a signal which indicates that the recipient terminal device R is being called, "RINGING", is transmitted from the SIP server 17 to the transmitter terminal device T (R1).

When the recipient terminal device R called by the SIP server 17 answers the call, the recipient terminal device R transmits a success response code "200 OK" to the SIP server 17 (R2). The SIP server 17 that received the success response code "200 OK" transmits the success response code "200 OK" to the transmitter terminal device T. The transmitter terminal device T transmits to the SIP server 17, "ACK" which indicates that the success response code has been received. The SIP server 17 that received "ACK" also transmits "ACK" to the recipient terminal device R (T2). An SIP connection is established between the transmitter terminal device T and the recipient terminal device R to form a communication status that enables various communication protocols. Further, the call control session formed until the SIP connection is established will be referred to as a "start call control session".

Before executing the communication protocol with the recipient terminal device R on the established SIP connection, the transmitter terminal device T transmits to the recipient terminal device R, a prescribed command for requesting the recipient terminal device R to present a supportable communication protocol (T3). In response to this, the recipient terminal device R presents the transmitter terminal device T with information of the communication protocol which can be supported by the recipient terminal device R (R3) Moreover, before executing the communication protocol, the transmitter terminal device T notifies the recipient terminal device R in advance with the communication protocol to be used (T4). After promoting the recipient terminal device R to be prepared for reception, the notified communication protocol is executed between the transmitter terminal device T and the recipient terminal device R, and the voice communication or the data communication is executed between one another (T5).

After completing the voice communication or the data communication (T6), the transmitter terminal device T transmits to the SIP server 17, "BYE" which requests disconnection of the SIP connection. The SIP server 17 that received "BYE" transmits "BYE" to the recipient terminal device R (T7). The recipient terminal device R transmits the success response code "200 OK" to the SIP server 17 (R4), and the SIP server 17 also transmits the success response code "200 OK" to the transmitter terminal device T. Then, the series of the session is ended (the communication is disconnected). Further, the call control session formed after the end of the media session and until the communication is disconnected will be referred to as the "end call control session".

Figure 3:
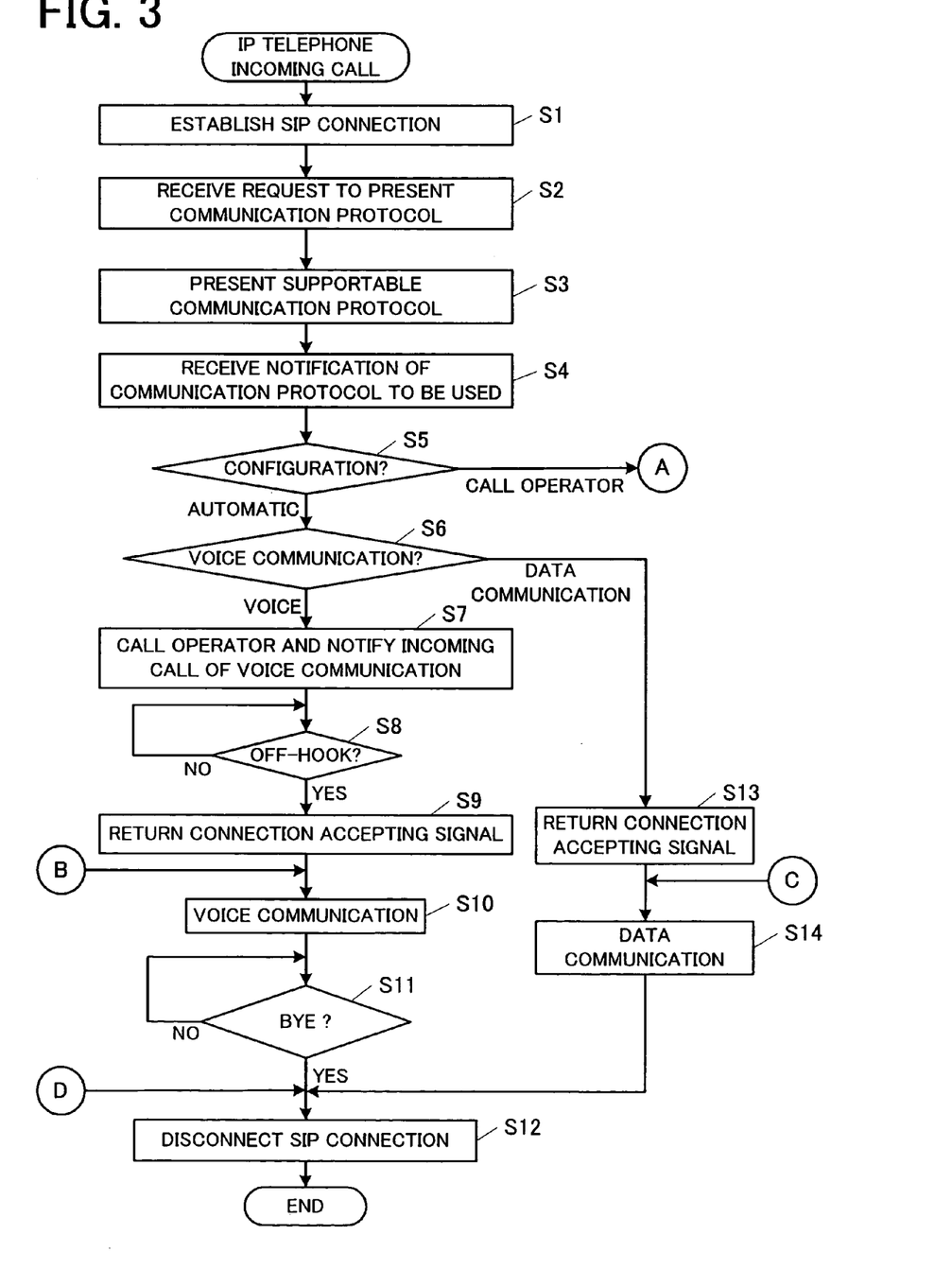
FIG. 3 is a flowchart showing a processing operation carried out when there is an incoming call in the communication terminal device according to a first embodiment of the present invention.
Figure 4:
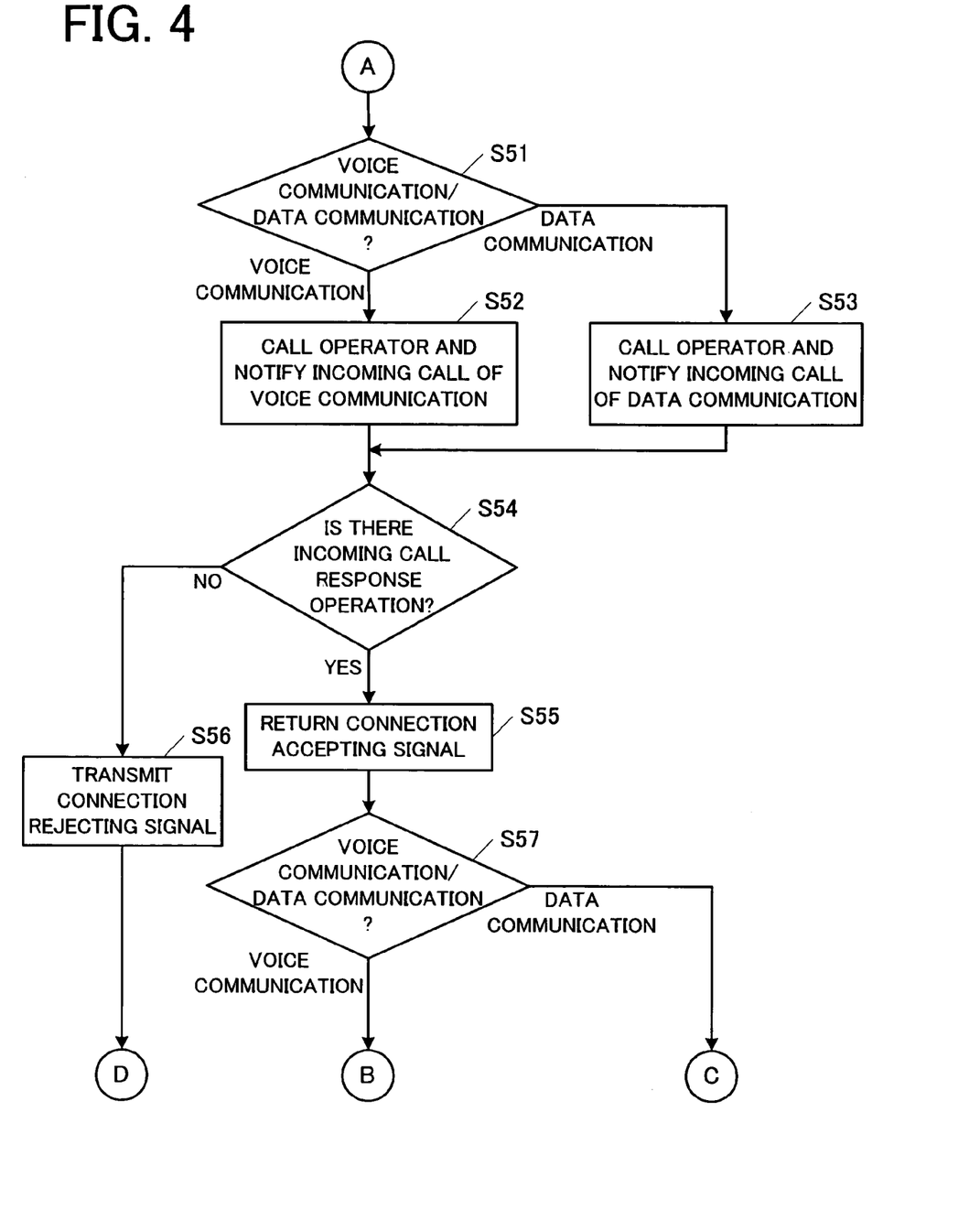
FIG. 4 is a flowchart showing a processing operation carried out when there is an incoming call in the communication terminal device according to the first embodiment of the present invention.

Next, in accordance with the flowcharts of FIGS. 3 and 4, the processing operation executed by the facsimile machine 1 as the recipient terminal device R when there is an incoming call by the call control protocol from the IP network will be described. Further, the operation of the facsimile machine 1 to be described in accordance with the flowcharts is carried out by following a command generated by the CPU 2 based on the control program stored in the ROM 4.

When receiving an incoming call by the IP telephone, in other words, when receiving "INVITE" from the SIP server 17, the facsimile machine 1 forms the start call control session, and establishes the SIP connection with the transmitter terminal device T which is the transmitter (S1).

Next, over the established SIP connection, the facsimile machine 1 receives a request from the transmitter terminal device T to present the supportable communication protocol of the facsimile machine 1 (S2, T3). The facsimile machine 1 presents information of the supportable communication protocol of the facsimile machine 1 (S3, R3), and receives a notification of the communication protocol to be used from the transmitter terminal device T (S4, T4).

Then, the facsimile machine 1 determines whether or not to process the incoming call automatically in accordance with the configuration information X. When processing automatically (when the configuration information X is "voice communication notification") (S5: AUTOMATIC), it is determined whether the incoming call relates to the voice communication or to the data communication in accordance with the contents of the notification of the communication protocol received in S4 (S6). When it is determined that the incoming call relates to the voice communication (S6: VOICE), the operator is notified by a notification unit that there is an incoming call relating to the voice communication (S7). Specifically, a prescribed buzzer sound (first buzzer sound) is activated by the speaker 9 which is the notification unit. In addition, a dialog indicating that there is an incoming call relating to the voice communication, for example, "There is an incoming voice communication.", is displayed on the display 8a which is also the notification unit. Then, as an operation of the operator to answer the incoming call, when the handset (receiver) P, which is an incoming call answering unit, is off-hooked (S8: YES), a communication connection accepting signal indicating such a fact is returned to the transmitter terminal device T (S9). The transmitter terminal device T that received the communication connection accepting signal determines that the facsimile machine 1 is off-hooked. Then, a state in which the facsimile machine 1 and the transmitter terminal device T can communicate with one another is established (S10, T5).

When the operator finishes the call with the recipient terminal device R and the handset of the transmitter terminal device T is on-hooked, "BYE" that requests the disconnection of the SIP connection is transmitted from the transmitter terminal device T to the SIP server 17, and the SIP connection is disconnected (S11:YES,S12).

Meanwhile, when it is determined in S6 that the incoming call relates to the data communication (S6: DATA COMMUNICATION), without carrying out a notification of the incoming call, a connection accepting signal (on-hook signal) is returned to the transmitter terminal device T (S13), and the data communication is carried out with the transmitter terminal device T (S14, T5). Then, after the end of the data communication, "BYE" that requests the disconnection of the SIP connection is transmitted from the transmitter terminal device T to the SIP server 17, and the SIP connection is disconnected (S12).

Next, the process carried out when the incoming call processing configuration in S5 is set to call the operator (S5: CALL OPERATOR) will be described. In this case, it is determined whether the incoming call relates to the voice communication or to the data communication in accordance with the contents of the notification of the communication protocol received in S4 (S51). When the incoming call relates to the voice communication (S51: VOICE COMMUNICATION), the operator is notified that the incoming call relates to the voice communication (S52). When the incoming call relates to the data communication (S51: DATA COMMUNICATION), the operator is notified that the incoming call relates to the data communication (S53). Specifically, when the incoming call relates to the voice communication, the first buzzer sound is activated by the speaker 9, and a dialog indicating that there is an incoming call relating to the voice communication, for example, "There is an incoming voice communication.", is displayed on the display 8a. Meanwhile, when the incoming call relates to the data communication, a second buzzer sound that is different from the first buzzer sound is activated by the speaker 9, and a dialog indicating that there is an incoming call relating to the data communication, for example, "There is an incoming data communication.", is displayed on the display 8a.

Next, when the handset P which is the incoming call answering unit is off-hooked by the operator in case the incoming call relates to the voice communication, or when a prescribed operation to start the data reception is carried out from the operation unit 8 which is also the incoming call answering unit in case the incoming call relates to the data communication (S54: YES), the connection accepting signal is returned to the transmitter terminal device T (S55). Meanwhile, when the connection is rejected by a prescribed operation from the operation unit 8 (S54: NO), a connection rejecting signal for rejecting the connection is transmitted to the transmitter (S56). Then, when the incoming call relates to the voice communication, the processing operation of S10 and onward, in other words, the process to establish the state in which the call can be made is carried out, and when the incoming call relates to the data communication, the processing operation of S14 and onward, in other words, the data communication or the like is executed (S57).

As described above, the facsimile machine 1 of the first embodiment calls the operator when receiving an incoming call relating to the voice communication, and carries out automatic reception when receiving an incoming call relating to the data communication. As a result, only when receiving an incoming call of the voice communication that needs to be answered by the operator, the operator can answer the incoming call by off-hooking the handset (receiver). Thus, the operation carried out to answer the incoming call is simplified. Moreover, according to a configuration, it is possible to call the operator for all incoming calls.

When such a configuration is made, the operator is notified in a manner that the operator can recognize whether the incoming call relates to the voice communication or to the data communication. Therefore, the operator can select whether or not to receive the incoming call after confirming the type of the communication. Furthermore, the operator can be called for all incoming calls and only when an operation to answer the incoming call is carried out by the operator, the incoming call is answered. Therefore, regardless of whether the incoming call relates to the voice communication or to the data communication, the operator can select whether or not to answer the incoming call.

Second Embodiment

Next, a facsimile machine 1A will be described as an example of the communication terminal device according to a second embodiment of the present invention. The facsimile machine 1A includes a function for classifying and receiving a packet received through the LAN interface 10 according to each transmitter. In addition, the facsimile machine 1A also includes a function for answering each of a plurality incoming calls and simultaneously executing a communication process when receiving incoming calls from a plurality of transmitters at the same time. The facsimile machine 1A differs from the facsimile machine 1 of the first embodiment on these functions.

Figure 5:
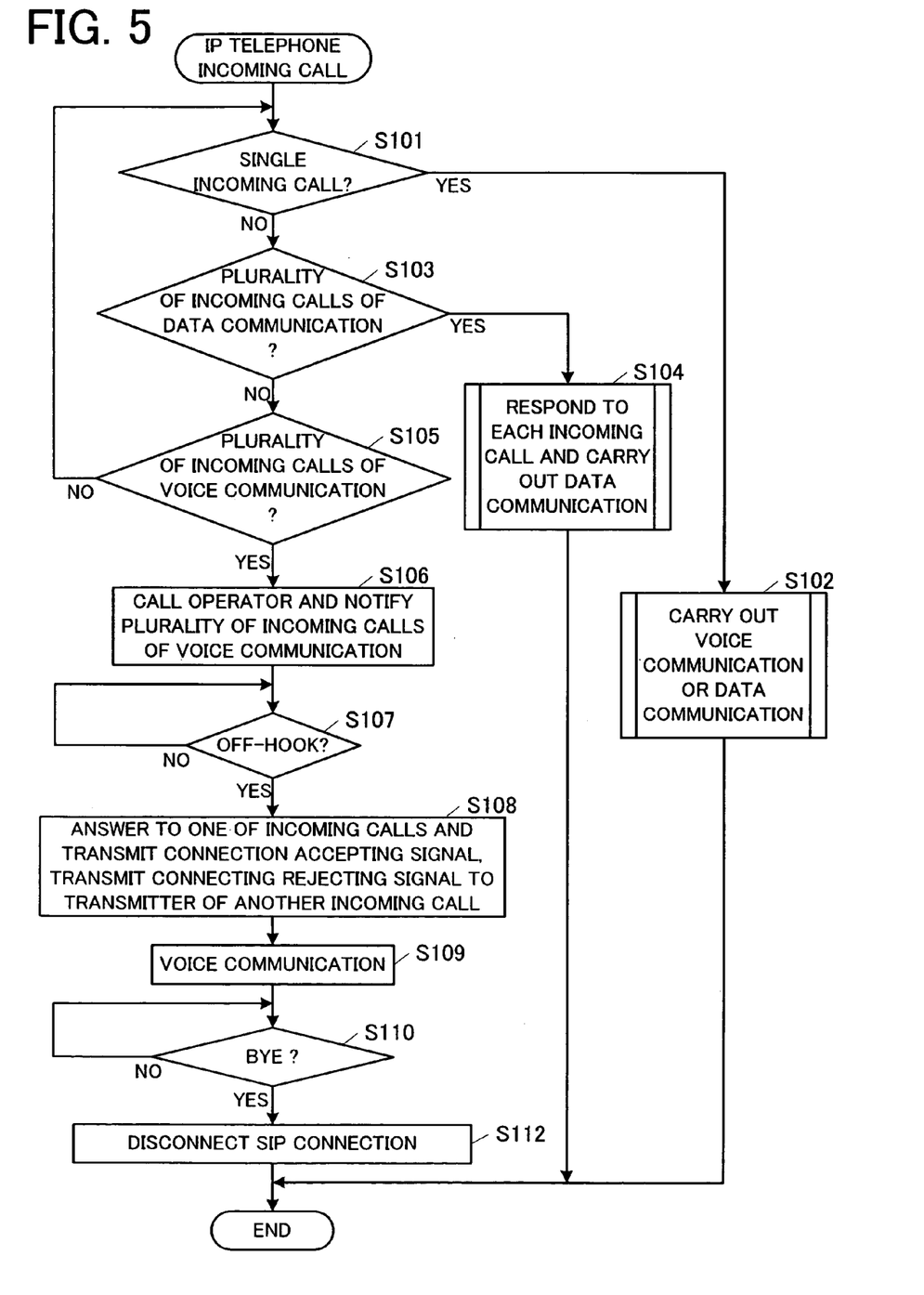
FIG. 5 is a flowchart showing a processing operation carried out when there is an incoming call in the communication terminal device according to a second embodiment of the present invention.

Next, in accordance with the flowchart of FIG. 5, the processing operation carried out when there is an incoming call in the facsimile machine 1A will be described. Further, the operation of the facsimile machine 1A to be described in accordance with FIG. 5 is carried out by following the command generated by the CPU 2 based on the control program stored in the ROM 4.

When there is an incoming call of the IP telephone in the facsimile machine 1A, the incoming call process of S1 through S4 described in the first embodiment is executed for each incoming call. In addition, a determination of whether there is a single incoming call, a determination of whether there are a plurality of incoming calls relating to the data communication, and a determination of whether there are a plurality of incoming calls relating to the voice communication are carried out in an order repetitively. When the incoming call corresponds to either one of the determinations, a prescribed processing operation to be described later is executed. The determination of whether there are a plurality of incoming calls relating to the voice communication and the determination of whether there are a plurality of incoming calls relating to the data communication are carried out in accordance with the contents of the communication protocol to be used that are received in S4 (whether the incoming call relates to the voice communication or to the data communication).

When there is a single incoming call (S101: YES), an answer is made to the incoming call, and the voice communication or the data communication is executed (S102). Here, the above-described processing operation of S6 through S14 is executed as the voice communication or the data communication.

Meanwhile, when there are a plurality of incoming calls relating to the data communication (S103: YES), an answer is made to each of the incoming calls and the data communication is executed (S104). That is, without carrying out a notification of the incoming calls, for each of the incoming calls, processes to return a connection accepting signal, to carry out the data communication and to disconnect the SIP connection are executed sequentially as the processing operation of S13, S14 and S12.

Meanwhile, when there are a plurality of incoming calls relating to the voice communication (S105: YES), the operator is notified that there are a plurality of incoming calls relating to the voice communication. Specifically, a third buzzer sound that is different from both the first buzzer sound and the second buzzer sound is activated by the speaker 9. In addition, a dialog indicating that there are a plurality of incoming calls relating to the voice communication, for example, "There are a plurality of incoming voice communications.", is displayed on the display 8a.

As an operation of the operator to answer the incoming call from the transmitter, when the handset P which is the incoming call answering unit is off-hooked (S107), an answer is made to either one of the incoming calls. A connection accepting signal indicating that the incoming call has been answered is returned to the transmitter terminal device T. In addition, a connection rejecting signal for rejecting the connection is transmitted to a transmitter of another incoming call (S108). Then, a state in which a call can be carried out is established only with the transmitter of which the incoming call has been answered (S109). Further, the incoming call to be answered in S107 can be either one of the incoming calls. For example, an incoming call order distinguishing unit can be provided to count an elapse of time from a reception of the incoming call for each of the incoming calls, and in accordance with the elapsed time, to distinguish an order in which the incoming calls are received. By providing the incoming call order distinguishing unit, the answer can be made to the incoming call received the earliest. Moreover, the connection rejecting signal is transmitted over the SIP connection without starting the voice communication. However, as the connection rejecting signal, a message indicating that the line is busy, for example, a voice message of "The line is busy. Please call back.", can be transmitted after starting the voice communication. Accordingly, the transmitter of which the incoming call was not answered by the facsimile machine 1A can learn the reason for the connection being rejected.

Next, the call with the recipient terminal device R is ended, and the handset of transmitter terminal device T is on-hooked. Then, when "BYE" that requests the disconnection of the SIP connection is transmitted from the transmitter terminal device T to the SIP server 17, the SIP connection is disconnected (S10,S112).

As described above, when there are a plurality of incoming calls relating to the data communication, the facsimile machine 1A of the second embodiment executes the data receiving process on the image data, the text data or the like for each of the incoming calls automatically. When there are a plurality of incoming calls relating to the voice communication, the facsimile machine 1A answers one of the incoming calls, and transmits the connection rejecting signal to the transmitter of another incoming call that was not answered by the facsimile machine 1A. As a result, the transmitter of the incoming call that was not answered by the facsimile machine 1A can determine at an early stage that the facsimile machine 1A cannot establish the connection.

What is claimed is:

1. A communication terminal device comprising:
   means for receiving an incoming call using an internet protocol network by a call control protocol;
   means for establishing a connection with a transmitter by the call control protocol based on the incoming call; and means for determining whether the incoming call is voice communication over the established connection,
wherein the means for determining determines whether the incoming call is the voice communication by exchanging information relating to a usable communication protocol over the established connection.

2. The communication terminal device according to claim 1, further comprising:
means for notifying the receiving of the incoming call regardless of whether the incoming call is the voice communication when the means for receiving receives the incoming call;
means for answering the incoming call; and
means for controlling to continue communication by maintaining the connection when the incoming call is to be answered, and to disconnect the connection when the incoming call is not to be answered.

3. The communication terminal device according to claim 1, further comprising:
means for setting whether to notify the receiving of the incoming call regardless of whether the incoming call is the voice communication when the means for receiving receives the incoming call.

4. A communication terminal device comprising:
means for receiving an incoming call using an internet protocol network by a call control protocol;
means for establishing a connection with a transmitter by the call control protocol based on the incoming call;
means for determining whether the incoming call is voice communication over the established connection; and
means for controlling to continue one voice communication and to disconnect the connection of all other voice communications when the means for receiving receives a plurality of incoming calls and the means for determining determines that all of the incoming calls relate to the voice communication.

5. A communication terminal device comprising:
means for receiving an incoming call using an internet protocol network by a call control protocol;
means for establishing a connection with a transmitter by the call control protocol based on the incoming call;
means for determining whether the incoming call is voice communication over the established connection; and
means for controlling to continue all communications when the means for receiving receives a plurality of incoming calls and the means for determining determines that all of the incoming calls are related to the data communication.

6. A communication terminal device comprising:
a reception unit which receives an incoming call using an internet protocol network by a call control protocol;
an establishing unit which establishes a connection with a transmitter by the call control protocol based on the incoming call; and
a determining unit which determines whether the incoming call is voice communication over the established connection,
wherein the determining unit determines whether the incoming call is the voice communication by exchanging information relating to a usable communication protocol over the established connection.

7. The communication terminal device according to claim 6, further comprising:
a notification unit which notifies the receiving of the incoming call regardless of whether the incoming call is the voice communication when the reception unit receives the incoming call;
an incoming call answering unit which answers the incoming call; and
a control unit which continues communication by maintaining the connection when the incoming call is to be answered, and to disconnect the connection when the incoming call is not to be answered.

8. The communication terminal device according to claim 6, further comprising:
a setting unit which sets whether to notify the receiving of the incoming call regardless of whether the incoming call is the voice communication when the reception unit receives the incoming call.

9. A communication terminal device comprising:
a reception unit which receives an incoming call using an internet protocol network by a call control protocol;
an establishing unit which establishes a connection with a transmitter by the call control protocol based on the incoming call;
a determining unit which determines whether the incoming call is voice communication over the established connection; and
a control unit which continues one voice communication and disconnects the connection of all other voice communications when the reception unit receives a plurality of incoming calls and the determining unit determines that all of the incoming calls relate to the voice communication.

10. A communication terminal device comprising:
a reception unit which receives an incoming call using an internet protocol network by a call control protocol;
an establishing unit which establishes a connection with a transmitter by the call control protocol based on the incoming call;
a determining unit which determines whether the incoming call is voice communication over the established connection; and
a control unit which continues all communications when the reception unit receives a plurality of incoming calls and the determining unit determines that all of the incoming calls are related to data communication.

11. A communication method comprising the steps of:
receiving an incoming call using an internet protocol network by a call control protocol;
establishing a connection with a transmitter by the call control protocol based on the incoming call; and
determining whether the incoming call is voice communication over the established connection,
wherein in the step of determining, it is determined whether the incoming call is the voice communication by exchanging information relating to a usable communication protocol over the established connection.

12. The communication method according to claim 11, further comprising the steps of:
notifying the receiving of the incoming call regardless of whether the incoming call is the voice communication when the incoming call is received in the step of receiving;
answering the incoming call; and
continuing communication by maintaining the connection when the incoming call is to be answered in the step of answering the incoming call, and disconnecting the connection when the incoming call is not to be answered.

13. The communication method according to claim 11, further comprising the step of:

setting whether to notify the receiving of the incoming call regardless of whether the incoming call is the voice communication when the incoming call is received in the step of receiving.

14. A communication method comprising the steps of:

receiving an incoming call using an internet protocol network by a call control protocol;

establishing a connection with a transmitter by the call control protocol based on the incoming call;

determining whether the incoming call is voice communication over the established connection; and continuing one voice communication and disconnecting the connection of all other voice communications when a plurality of incoming calls are received in the step of receiving and all of the incoming calls are determined to relate to the voice communication in the step of determining.

15. A communication method comprising the steps of:

receiving an incoming call using an internet protocol network by a call control protocol;

establishing a connection with a transmitter by the call control protocol based on the incoming call;

determining whether the incoming call is voice communication over the established connection; and continuing all communications when a plurality of incoming calls are received in the step of receiving and all of the incoming calls are determined to be related to data communication in the step of determining.

\* \* \* \* \*

UNITED STATES PATENT AND TRADEMARK OFFICE
CERTIFICATE OF CORRECTION

PATENT NO.      : 7,068,763 B2
APPLICATION NO. : 10/745651
DATED           : June 27, 2006
INVENTOR(S)     : Yoshifumi Tanimoto et al.

It is certified that error appears in the above-identified patent and that said Letters Patent is hereby corrected as shown below:

Title Page:

Item (75), Inventors, please delete "Gary Burrell, Wyckoff, NJ (US); Roy Charles McNeil, Jr., Warwick, NY (US)" and insert -- Yoshifumi Tanimoto, Osaka (JP) --.

ITEM (12) DELETE BURRELL ET AL. AND

REPLACE WITH -- TANIMOTO ET AL. --.

Signed and Sealed this

Seventh Day of November, 2006

JON W. DUDAS
*Director of the United States Patent and Trademark Office*